United States Patent
Tsuchimoto et al.

[11] Patent Number: 5,543,242
[45] Date of Patent: Aug. 6, 1996

[54] APPARATUS FOR DISPOSING OF SODIUM SULFUR CELLS

[75] Inventors: Tomonori Tsuchimoto, Hashima-Gun; Katsuichi Iwata, Ichinomiya City; Yoshihiko Kurashima, Nagoya City, all of Japan

[73] Assignee: NGK Insulators, Ltd., Japan

[21] Appl. No.: 206,609

[22] Filed: Mar. 7, 1994

[30] Foreign Application Priority Data

Mar. 24, 1993 [JP] Japan ........................... 5-065122
Nov. 19, 1993 [JP] Japan ........................... 5-290560

[51] Int. Cl.$^6$ ........................ H01M 6/50; H01M 10/42; C21C 7/10; B23P 21/00
[52] U.S. Cl. ........................ 429/049; 266/207; 29/563; 29/564.1; 29/711; 29/722; 29/763; 29/33 T
[58] Field of Search ........................ 266/207; 429/49; 29/33 T, 711, 722, 763, 563, 564.1

[56] References Cited

U.S. PATENT DOCUMENTS

| | | | |
|---|---|---|---|
| 1,666,847 | 4/1928 | Cote | 29/763 |
| 3,895,424 | 7/1975 | Hautau | 29/563 |
| 3,914,853 | 10/1975 | Jauch | 29/563 |
| 4,464,830 | 8/1984 | Carlsson | 429/49 |
| 5,120,616 | 6/1992 | Bauer | 429/49 |

Primary Examiner—Charles L. Bowers, Jr.
Assistant Examiner—J. Pasterczyk
Attorney, Agent, or Firm—Parkhurst, Wendel & Burr

[57] ABSTRACT

An apparatus for disposing of a plurality of sodium sulfur cells is disclosed, which comprises: a work-setting pipe unit including a plurality of cell-holding pipes, a work-setting station for setting the cells into the work-setting pipe unit, a heating oil vessel, a sodium-extracting station, an inner tube-extracting station, an unloading station where the remaining sodium sulfur cells are unloading from the work-setting pipe unit, and a transferring unit for transferring said work-setting pipe unit among said stations.

3 Claims, 7 Drawing Sheets

FIG_2

FIG_6

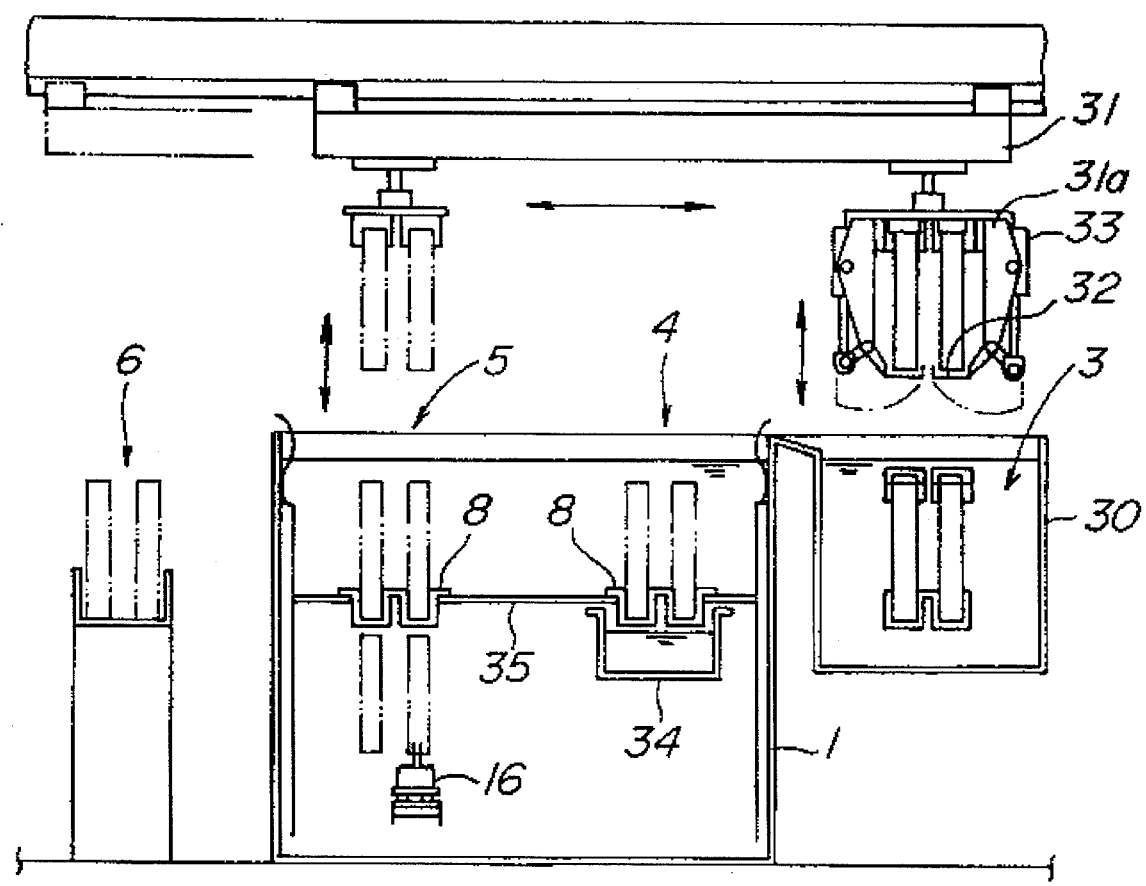
FIG_8

1

APPARATUS FOR DISPOSING OF SODIUM SULFUR CELLS

BACKGROUND OF THE INVENTION

(1) Field of the Invention

The present invention relates to a process and an apparatus for disposing of spent sodium sulfur cells through dismantling the sodium sulfur cells.

(2) Related Art Statement

The sodium sulfur cell is a chargeable cell filled with sodium and sulfur inside and outside a solid electrolyte tube made of such as β-alumina, for example. Since the sodium sulfur cell has capacity to store a huge amount of electric power, the cell has attracted public attention as an electric power-storing cell. However, since it is thought that such a cell has a service life of about 10 years, it is anticipated that a large number of spent sodium sulfur cells will exist in the future. However, a technology for disposing of the sodium sulfur cells has not been established, and no apparatus therefor has been developed. Therefore, no conventional technology exists at all against the present invention.

The present inventors have been developing the technology for disposing of the spent sodium sulfur cells, and clarified that in order to dispose of the sodium sulfur cell, it is necessary to form an opening in the cell by cross-cutting the cell, recovering sodium from the interior of the cell through the opening, and extracting a metallic inner tube from an outer tube in a multiple-tube structure of the cell. However, it was discovered that since both the inner and outer tubes are thin and long and since sodium, etc. exist between the tubes, the inner tube cannot be extracted from the outer tube if their axes are deviated from each other even slightly, and that it is not easy to automatically effect such an extracting work. Furthermore, although the inner tubes can be extracted from the outer tubes by checking the sodium sulfur cells one by one and aligning the inner and outer tubes, a long time is necessary to dispose of one cell, which makes it impossible to dispose of a large number of the cells.

The present invention is to solve the above problems possessed by the above art, and to provide a process and an apparatus for disposing of sodium sulfur cells, which can simultaneously and automatically recover sodium and extract inner tubes from a plurality of the sodium sulfur cells.

SUMMARY OF THE INVENTION

The process for disposing of the sodium sulfur cells according to the present invention, which has been accomplished to solve the above-mentioned problems, includes the steps of:

(A) cross-cutting each of said sodium sulfur cells to form an opening;
(B) setting said sodium sulfur cells, as one set, into a work-setting pipe unit such that said opening of each of said sodium sulfur cells is downwardly directed;
(C) flowing down sodium from a set of said sodium sulfur cells inside a heating oil vessel through said openings by heating;
(D) inserting pawls of a chuck into each of a plurality of said sodium sulfur cells through a bottom of said work-setting unit; and
(E) extracting an inner tube from an outer tube in each of said sodium sulfur cells.

The apparatus for disposing of the sodium sulfur cells according to the present invention, which has been also accomplished to solve the above-mentioned problems, includes:

a work-setting pipe unit integrated with a plurality of holding pipes each having, in a bottom portion, a through hole slightly greater than an outer periphery of an inner tube of the sodium sulfur cell;

a work-setting station in which a plurality of said sodium sulfur cells are set to said work-setting pipe unit;

a heating oil vessel;

a sodium-extracting station which holds said work-setting pipe unit inside said heating oil vessel to flow sodium down from the cell;

an inner tube-extracting station in which pawls of a chuck are inserted into an inner tube of each of said sodium sulfur cells inside the heating oil vessel through the through hole of the bottom portion of the work-setting pipe unit and then the inner tubes of said cells are extracted;

a take-out station to which a plurality of said sodium sulfur cells from which the sodium and the inner tube have been removed are taken out from the work-setting pipe unit, and a transfer unit for transferring work-setting pipe unit among said stations.

Further, the pawls of the chuck in the inner tube-extracting station are preferably slidable in X- and Y-directions. In addition, it may be that the work-setting station is provided inside an oil vessel, and the transfer unit transfers the sodium sulfur cells into the heating oil vessel in the state that the openings of the cells are being sealed.

According to the process and the apparatus for disposing of the sodium sulfur cells in the present invention, a plurality of the sodium sulfur cells preliminarily formed with the openings are placed as one set into the work-setting pipe unit in the work-setting station, and after this set of the sodium sulfur cells are transferred to the sodium-extracting station inside the heating oil vessel, the sodium is extracted from a plurality of the sodium sulfur cells, then the cells are transferred to the inner tube-extracting station inside the heating oil vessel, and the inner tubes are extracted from the cells in the inner tube-extracting station. Therefore, the number of the sodium sulfur cells to be disposed of per unit time can be increased. In addition, the inner tubes are extracted from the cells in the state that the pawls of the chucks are inserted through the through holes of the bottom portion of the work-setting pipe unit.

The work-setting pipe unit is provided with a plurality of holding pipes into which the sodium sulfur cells are placed downwardly, and bottoms of the holding pipes are provided with respective through holes through which the pawls of the chucks are inserted. In this case, the inner diameter of each of the holding pipes is preferably set such that the sodium sulfur cell may be loosely held inside the holding pipe and even if the axis of the inner tube is slightly deviated from that of the sodium sulfur cell, the sodium sulfur cell can be freely slightly moved or inclined inside the holding pipe so as to make it possible to smoothly extract the inner tube.

The following is also preferred.

That is, a bottom portion of each of the holding pipes is provided with the through hole having a diameter greater than the outer diameter of the inner tube periphery of the sodium sulfur cell, and the inner diameter of the holding pipe is set at such a value that even when the cell is closely pressed against one side of the inner wall of the holding pipe, an end of an inner hollow portion of the inner tube of the sodium sulfur cell is entirely located inside the through hole of the holding pipe. In this case, when the chuck is aligned with the axis of the holding pipe and the outermost space between the pawls of the chuck is set at a value narrower than the inner diameter of the through hole of the holding pipe, the pawls of the chuck can be easily inserted into the inner tube. This enables the inner tubes of the sodium sulfur cells to be automatically extracted by appropriately arranging or aligning the chucks with the pawls.

Further, when the pawls of the chuck are slidable in the X- and Y-directions of the inner tube-extracting station, the pawls of the chuck can be slid and freely and automatically aligned with the axis of the inner tube. Thereby, the inner tube can be more smoothly extracted.

Furthermore, when the work-setting station is provided inside the oil vessel and the sodium sulfur cells are transferred from the oil vessel to the interior of the heating oil vessel in the state that the openings of the cells are sealed, sodium inside the cells is prevented from contacting air, so that insufficient discharge of the sodium from the cells due to oxidation thereof can be avoided.

These and other objects, features and advantages of the invention will be appreciated upon reading the following description of the invention when taken in conjunction with the attached drawings.

BRIEF DESCRIPTION OF THE ATTACHED DRAWINGS

For a better understanding the invention, reference is made to the attached drawings, wherein:

FIG. 8 is a vertical sectional view for illustrating a second embodiment of the apparatus for disposing of sodium sulfur cells according to the present invention.

DETAILED DESCRIPTION OF THE INVENTION

The present invention will be explained below in more detail with reference to embodiments shown in the attached drawings.

Figure 1:
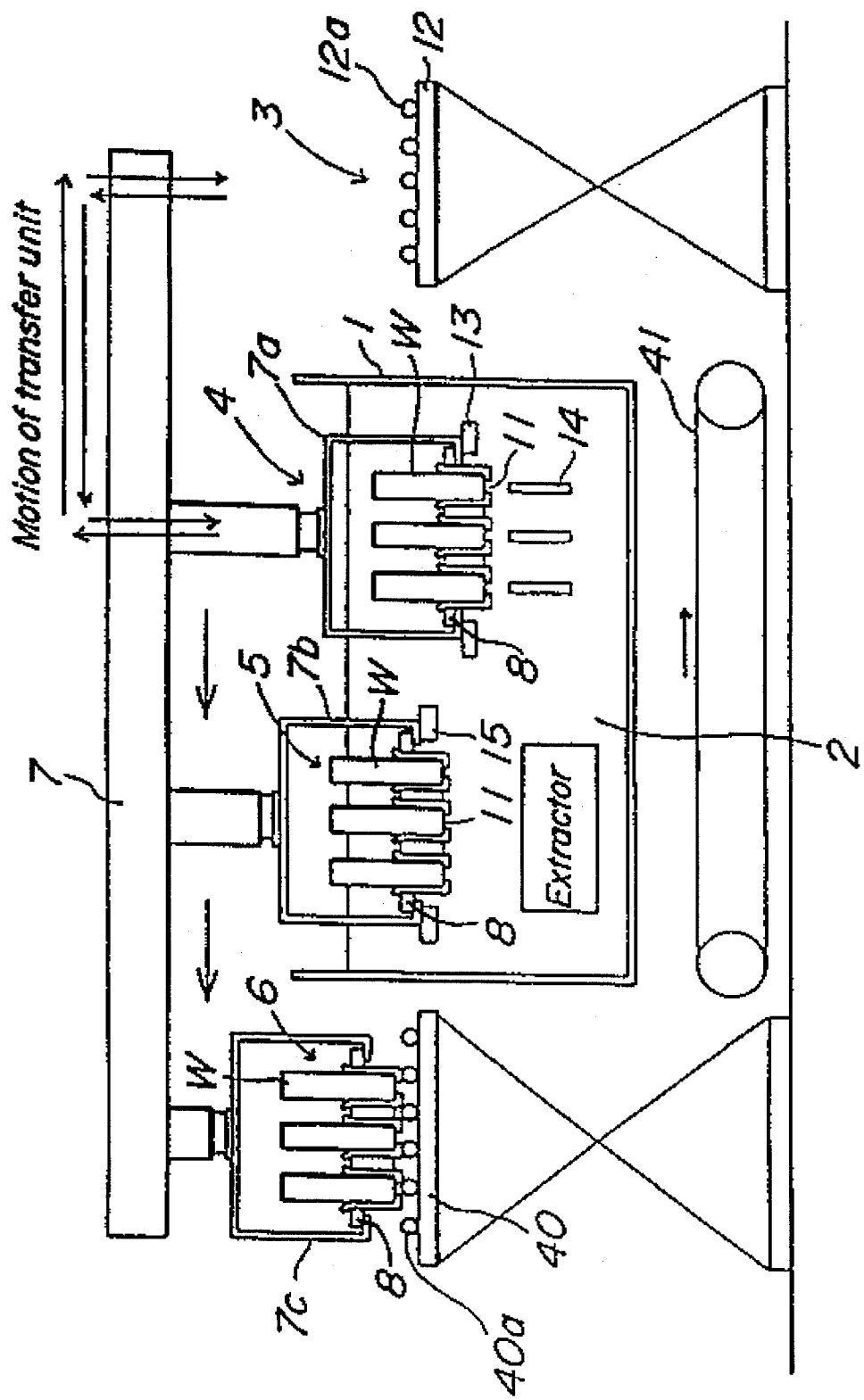
FIG. 1 is a vertically sectional view for illustrating a first embodiment of the apparatus for disposing of sodium sulfur cells according to the present invention.
Figure 2:
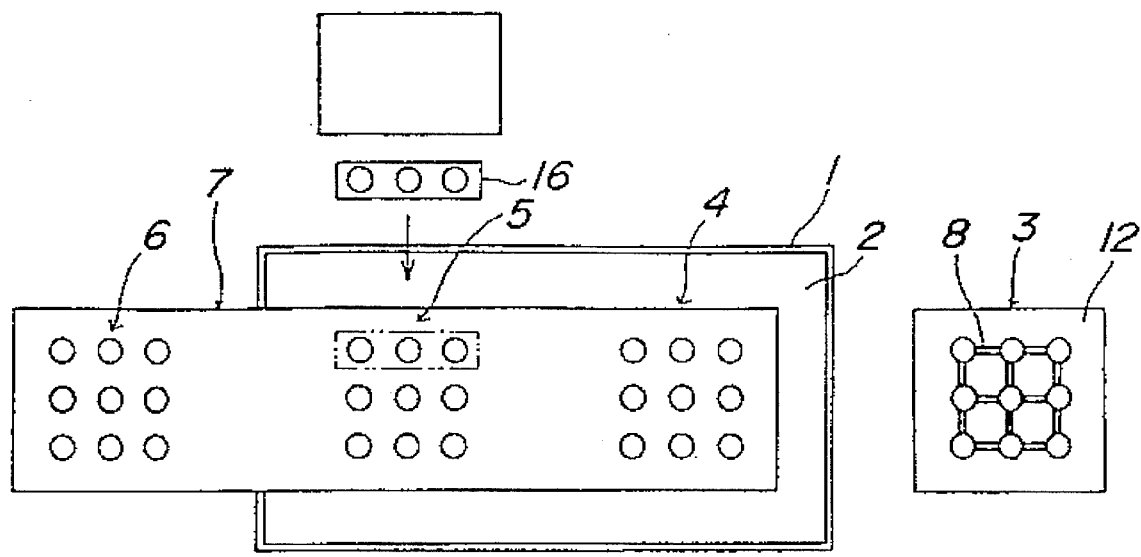
FIG. 2 is a plane view for schematically illustrating the first embodiment of the apparatus for disposing of the sodium sulfur cells according to the present invention.

FIG. 1 is a vertical sectional view of an apparatus for disposing of sodium sulfur cells according to the first embodiment of the present invention. In FIG. 1, a heating oil vessel 1 is filled with molten paraffin 2 to be heated to, for example, 110°–130° C. A work-setting station 3 is arranged outside the heating oil vessel 1, and a sodium-extracting station 4 and an inner tube-extracting station 5 are positioned inside the heating oil vessel 1. An unloading station 6 is also arranged outside the heating oil vessel 1. A transfer unit 7 is provided with three heads 7a, 7b and 7c for transferring work-setting units 8 among the above stations 3, 4, 5 and 6.

Figure 3:
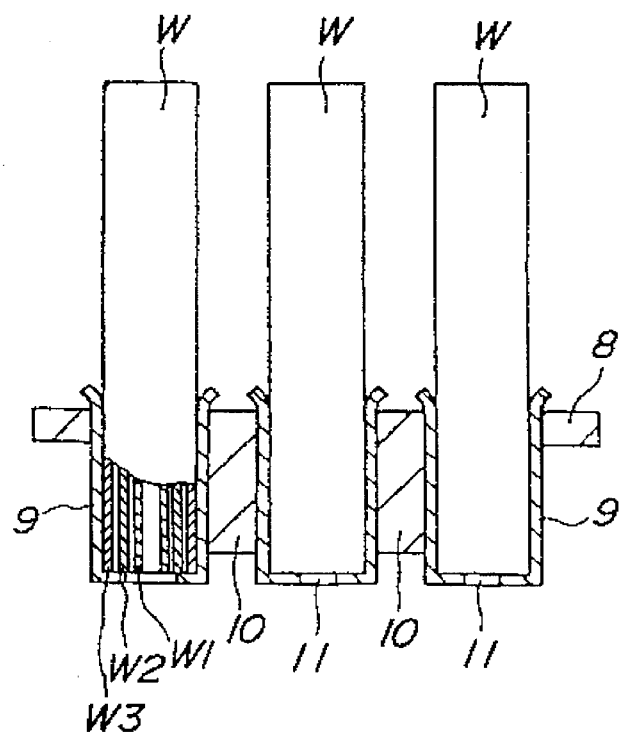
FIG. 3 is a sectional view of a work-setting pipe unit.

As shown in FIG. 3 in an enlarged scale, the work-setting pipe unit 8 used in the present invention is constituted by integrating plural holding pipes 9 with a rib-shaped connecting section 10, and the sodium sulfur cell W can be loosely held inside the holding pipe. A bottom portion of each of the holding pipes 9 is provided with a through hole 11 slightly greater than an outer periphery of the inner tube W1 of the sodium sulfur cell W but smaller than the outer periphery of the safe tube $W_2$. The sodium sulfur cell W is constituted by the inner tube W1, a safe tube W2, and an outer tube W3 successively arranged from an interior side thereof. In this embodiment, the work-setting pipe unit 8 has an layout consisting of 3×3 holding pipes in lateral and vertical directions, which enables the work-setting pipe unit to simultaneously receive nine sodium sulfur cells W as a set. Needless to say, the above layout of the work-setting pipe unit as well as the number of the sodium sulfur cells to be held as one set in the work-setting pipe unit may be freely varied.

In this embodiment, the work-setting station 3 is provided with a table, and rollers 12a are arranged on an upper face of the work-setting station 3. On this table 12, nine sodium sulfur cells are set into the holding pipes 9 of the work-setting pipe unit 8 by hand. In a proceeding step, as shown in FIG. 3, an opening is formed by cross-cutting each of the sodium sulfur cells W, and the opening is located downwardly when the cell is set into the holding pipe.

An on/off type chuck 7a of the transfer unit 7 chucks the work-setting pipe unit 8 upon which the sodium sulfur cells W are set as mentioned above, and the work-setting pipe unit 8 is transferred to the sodium-extracting station 4 inside the heating oil vessel 1 together with the sodium sulfur cells as shown in FIG. 1. An appropriate holding member 13 is provided inside the heating oil vessel 1, and the work-setting pipe unit 8 is held inside the heating oil vessel 1 by the holding member 13. After the work-setting pipe unit 8 is held by the holding member 13, the chuck 7a is released from the work-setting pipe unit 8 and moved upwardly. Then, the chuck 7a is moved to a waiting position above the work-setting station 3.

In the sodium-extracting station 4, when the sodium sulfur cells W are held in the heating oil vessel 1, for example, for around 20 minutes, sodium melts and flows down from the sodium sulfur cells W into the heating oil vessel 1. Since the heating oil vessel 1 is filled with molten paraffin 2, sodium precipitates at the bottom portion of the vessel without contacting air. As shown in FIG. 1, when nozzles 14 are upwardly provided in the vessel 1 to eject an inert gas such as nitrogen gas toward the sodium-extracting station 4, melted sodium can be completely discharged from the interior of the sodium sulfur cells W.

After sodium is discharged from the cells in this manner, an on/off chuck 7b of the transfer unit 7 is moved downwardly to chuck the work-setting pipe unit 8, and transfers the work-setting pipe unit 8 to the succeeding inner tube-extracting station 5. An appropriate holding member 15 is provided at the inner tube-extracting station 5 inside the heating oil vessel 1, and the work-setting pipe unit 8 is held by the holding member 15. Thereafter, the chuck 7b is released from the work-setting pipe unit 8, moved up and returned to a waiting position above the sodium-extracting station 4.

Figure 4:
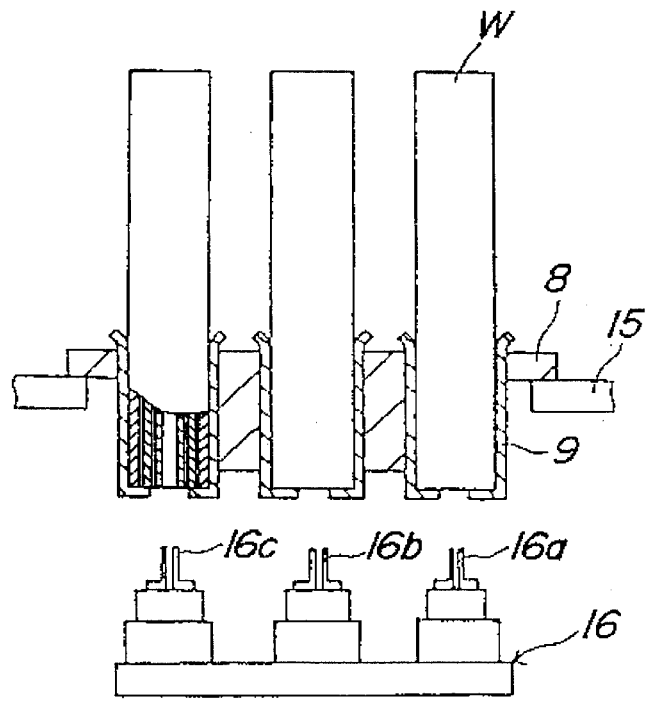
FIG. 4 is a front view for illustrating the relation between the work-setting unit and chuck heads of an inner tube-extracting unit.

The inner tube-extracting station 5 is provided with an inner tube-extracting unit. As shown in FIG. 4, the inner tube-extracting unit includes a chuck head 16 provided with three pairs of chuck pawls 16a, 16b and 16c. Each pair of the chuck pawls can be opened or closed, so that the inner tube W1 of the sodium sulfur cell can be chucked by a pair of the chuck pawls from the inner side. Therefore, when the inner tubes of the cells are chucked by three pairs of the chuck pawls 16a, 16b and 16c, respectively, and the chuck pawls 16a, 16b and 16c are descended, three inner tubes W1 can be simultaneously extracted from the cells. In this way, the inner tubes W1 can be extracted from the respective nine sodium sulfur cells W by repeatedly effecting the above operation three times. Alternatively, when only one chuck head is employed, the inner tubes W1 can be successively extracted by moving the chuck pawls through centers of the sodium sulfur cells W in the work-setting pipe unit 8 by numerical control.

Figure 5:
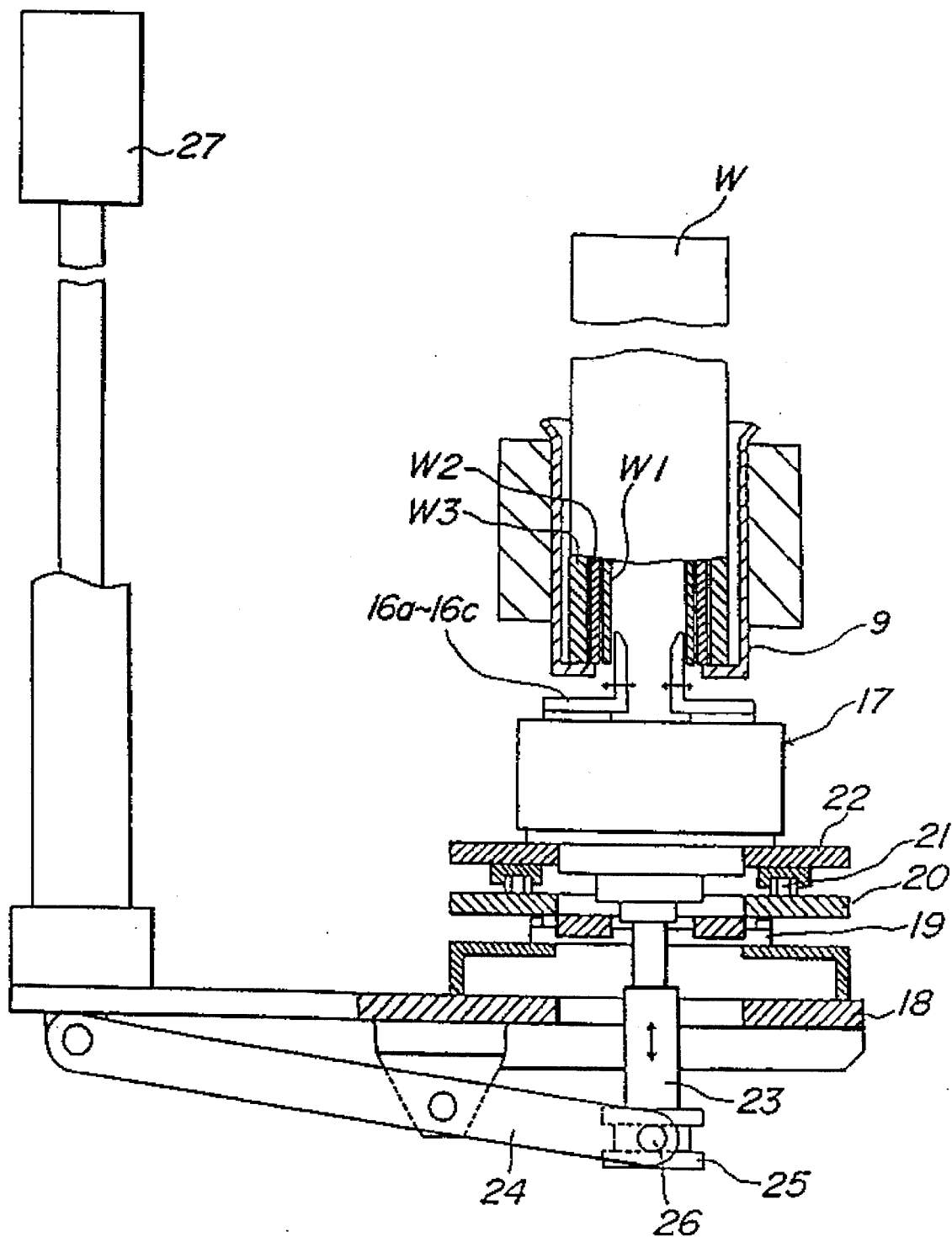
FIG. 5 is a sectional view of the chuck head in the first embodiment as viewed in a lateral direction.
Figure 6:
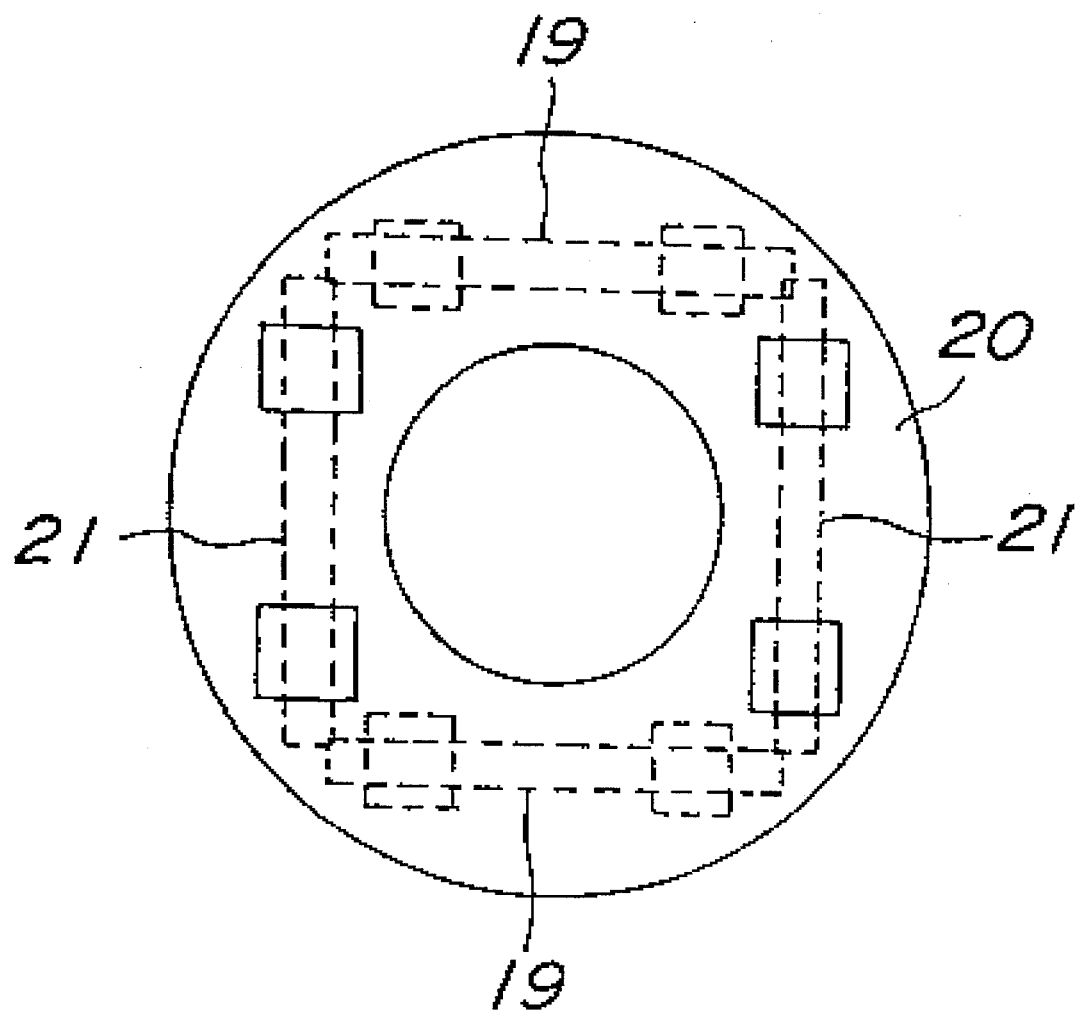
FIG. 6 is a plane view of the chuck head in the first embodiment.

FIG. 5 is a sectional view of the chuck head 16 in the first embodiment as viewed in a lateral direction. As shown in FIG. 5, each pair of the chuck pawls 16a, 16b, 16c projects from an upper face of an opening/closing mechanism 17, which is not fixed to a base 18 of the chuck head 16 but supported thereon slidably in both X- and Y-directions. That is, as shown in FIGS. 5 and 6, a pair of rails 19 are provided on an upper face of the base 18 in the X-direction, and on the rails 19 is supported a first slide plate 20 slidably in the X-directions. A pair of rails 21 are provided, in the Y-directions, on an upper face of the first slide plate 20. On the rails 21 are supported a second slide plate 22 slidably in the Y-directions. The opening/closing mechanism 17, which supports the chuck pawls 16a, 16b and 16c, is placed on the second slide plate 22. By so constructing, the chuck pawls 16a, 16b and 16c can be arbitrarily slid relative to the base 18 for the chuck head 16 in the X- and Y-directions. In the inner tube-extracting step, the center of each of the chucking pawls 16a, 16b and 16c can be made in conformity with the center of the cell held in the holding pipe in the work-setting pipe unit located in the inner tube-extracting station 5. On the other hand, since the sodium sulfur cell is slightly loosely fitted into the holding pipe, the center of the holding pipe may not be accurately in conformity with that of the hollow portion of the inner tube of the sodium sulfur cell in some cases. On the other hand, the center axis of the inner tube may be slightly deviated from or inclined to that of the sodium sulfur cell. Even at that time, the chuck pawls can be assuredly inserted into the hollow portion of the inner tube by moving the chuck head in the X- and/or Y-direction. In this case, if the inner diameter of the inner wall of the holding tube is appropriately set in connection with the outer diameter of the sodium sulfur cell, the above center alignment can be easily effected by moving the chuck pawls in the X- and/or Y-direction by, for example, about ±3 mm relative to the center.

In order to always assuredly insert the chuck pawls into the hollow portion of the inner tube to extract the inner tube from the safe tube, an appropriate consideration may be preferably paid upon the relationship between the outer tube of the cell, the outer diameter of the inner tube, the inner diameter of the holding pipe, the diameter and the location of the through hole of the holding pipe at the bottom portion, and the outer diameter of the safe tube. That is, the outer tube of the cell, the outer diameter of the inner tube, the inner diameter of the holding pipe, the diameter and the location of the through hole of the holding pipe at the bottom portion, and the outer diameter of the safe tube are preferably so set that even if the cell is pressed against the inner peripheral wall of the holding pipe on one side, the outer periphery of the inner tube of the cell at the bottom end is entirely located inside the through hole, whereas the outer periphery of the safe tube W2 of the cell is located outside the peripheral edge of the through hole. In this case, a sliding amount of each set of the pawls may be limited to, for example, around ±3 mm relative to an intended location in one extracting operation. Even if the center of the cell deviates from the center of the holding pipe at the maximum, the chuck pawls as closed can be assuredly inserted into the hollow portion of the inner tube W1.

As shown in FIG. 5, an opening/closing shaft 23 extends downwardly from the opening/closing mechanism 17 through the slide plates 20, 22 and the base 18, and connected to a link mechanism 24 under the base 18 through a transmitting mechanism including a grooved round disc 25 and a pair of rollers 26 fitted to a groove of the round disc 25. The link mechanism 24 is moved by a cylinder 27 connected to the link mechanism 24 through a rod, which moves up or down the opening/closing shaft 23 to open or close each set of the chuck pawls 16a, 16b and 16c. Although each set of the chuck pawls 16a, 16b, 16c can be slid relative to the base 18 by only a short distance in the X- and Y-directions, the slid amount is absorbed by the grooved round disc 25 and a pair of the rolls 26, so that a force can be assuredly transmitted to the opening/closing shaft 23.

Figure 7:
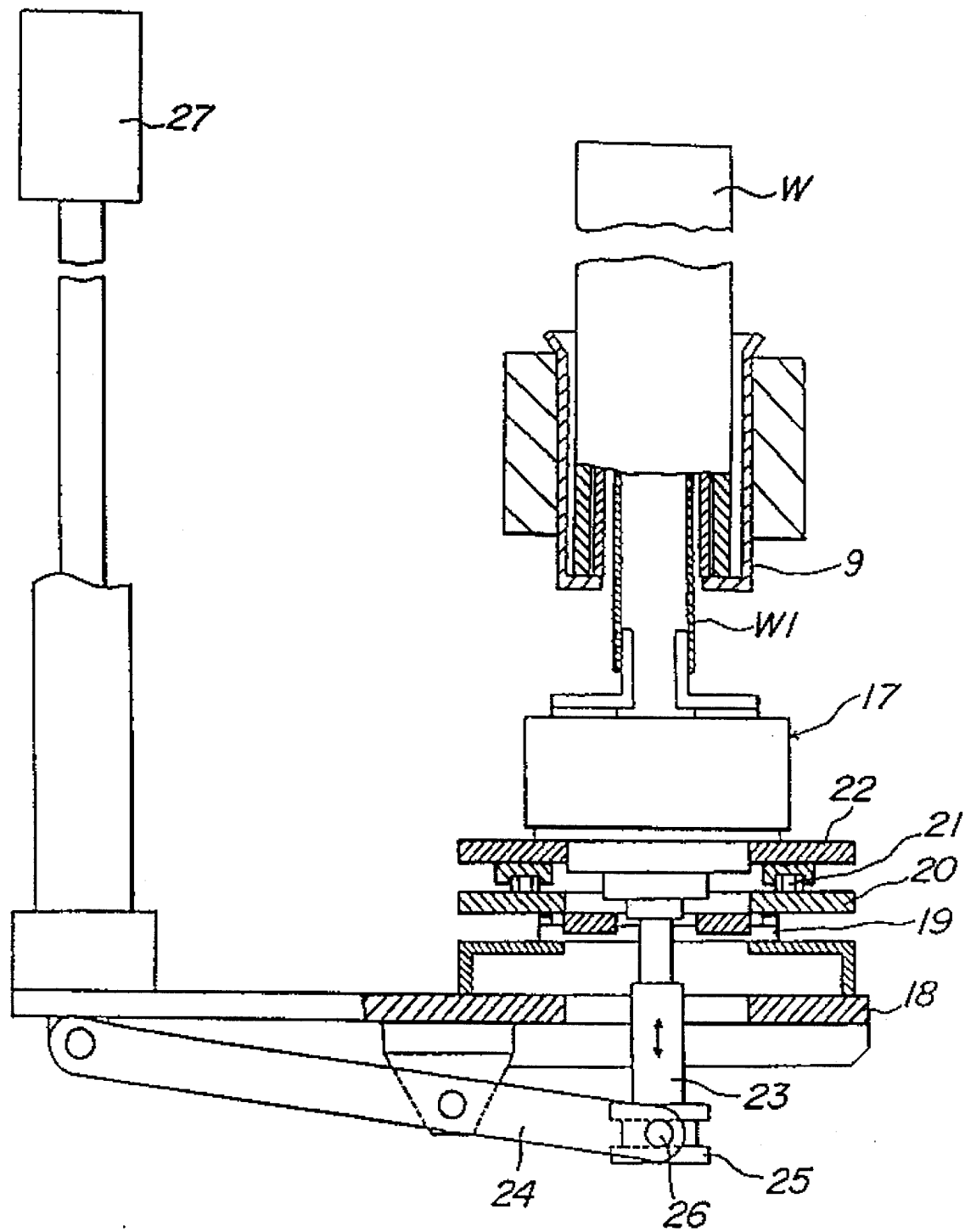
FIG. 7 is a sectional view for illustrating the state in which the pawls of the chuck of the inner tube-extracting unit is to extract the inner tube.

According to the first embodiment of the invention, in this manner, the inner tubes W1 are pulled out from the sodium sulfur cells W below the work-setting pipe unit 8 by means of the chuck heads 16. This pulling-out state is shown in FIG. 7. At that time, in some cases, as mentioned above, the center of the inner tube W1 may be slightly deviated or inclined from that of the sodium sulfur cell W. However, the sodium sulfur cell W is loosely received in the holding pipe 9 in the work-setting pipe unit 8, and each set of the chuck pawls 16a, 16b, 16c is slidable in the X- and Y-directions. Therefore, when the inner tube W1 is chucked by means of each set of the chuck pawls 16a, 16b, 16c, the sodium sulfur cell W can correspondingly move inside the holding pipes 9 so that the center of the cell may be aligned with that of the chuck pawls to enable the inner tube W1 to be smoothly extracted from the cell.

In this way, after the inner tube W1 is completely extracted, a chuck 7c shown in FIG. 1 is moved down to chuck the work-setting pipe unit 8, and transfers the unit 8 to the unloading station 6. In this position, a table 40, which has rollers 40a on an upper face, is arranged, and the sodium sulfur cells from which the inner tubes W1 are extracted are removed from the work-setting pipe unit 8. The empty work-setting pipe unit 8 is returned to the work-setting station 3 by means of a return conveyor 41 arranged under the heating oil vessel 1. However, if the layout is modified such that the unloading station 6 is arranged adjacent the work-setting station 3, the return conveyor 41 may be omitted.

Next, a second embodiment of the present invention will be explained below.

In the above-explained first embodiment, a plurality of the sodium sulfur cells W having the end portions opened are set into the work-setting pipe unit in air, which is transferred to the interior of the heating oil vessel 1. However, sodium may contact air and be thereby oxidized, which hinders smooth discharge of the sodium from the cells even when it is heated inside the heating oil vessel 1. The second embodiment is aimed at solving such a problem.

As shown in FIG. 8, in the second embodiment, an oil vessel 30 is arranged adjacent a heating oil vessel 1, and a work-setting station 3 is arranged inside the oil vessel 30.

That one of chucks, 31a, of a transferring unit 31, which reciprocates between the work-setting station 3 and the heating oil vessel 1, is provided with a dish-shaped members 32 at a lower portion thereof to cover the openings of the sodium sulfur cells W from the lower side. More specifically, in the second embodiment in FIG. 8, the dish-shaped means includes dish-shaped members 32 which are moved to cover or uncover the openings of the corresponding sodium sulfur cells W from the lower side by pistons 33 when the cells are held in a holding member of the work-setting pipe unit 8. Accordingly, when the sodium sulfur cells W are set into the work-setting pipe unit 8 in the work-setting station 3 arranged inside the oil vessel 30 and then the work-setting station 3 is transferred into the heating oil vessel 1 together with the cells in the state that the openings of the cells are being covered with the respective disk-shaped members 32, the interior sodium is prevented from contacting air because the openings of the sodium sulfur cells W are sealed with oil such as paraffin stored in the dish-shaped members 32. Alternatively, the openings of the sodium sulfur cells may be directly sealed by using heat-resistant packings or the like instead of the dish-shaped members 32.

In addition, in the embodiment of FIG. 8, a sodium-receiving box 34 is arranged in a lower portion of the sodium-extracting station 4. This sodium-receiving box 34 recovers molten sodium before the sodium flows down to the bottom of the heating oil vessel 1. In the embodiment of FIG. 8, a horizontal rail 35 is provided between the sodium-extracting station 4 and the inner tube-extracting station 5 so that the work-setting pipe unit 8 may be transferred to the inner tube-extracting station 5 in the state that the work-setting pipe unit 8 or the cells are being immersed into the paraffin. The other features in the embodiment of FIG. 8 are the same as those of the first embodiment, and therefore explanation thereof is omitted.

As having been explained above, according to the process and the apparatus for disposing of the sodium sulfur cells in the present invention, recovery of sodium and removal of the inner tubes from a plurality of the sodium sulfur cells can be simultaneously and automatically effected in the consecutive steps during one disposing operation. Further, even when the center of the inner tube is slightly derivated or inclined from that of the sodium sulfur cell, the inner tube can be smoothly extracted from the cell. Furthermore, when the chuck pawls are movable or slidable in the X- and Y-directions, the center alignment can be automatically effected, which can realize more smooth extraction of the inner tubes from the cells. Moreover, when the work-setting station is arranged inside the oil vessel and the sodium sulfur cells are transferred inside the heating oil vessel in the state that the openings of the cells are being sealed, sodium inside the cells is prevented from contacting air, which enables sodium to be more smoothly discharged.

We claim:

1. An apparatus for dismantling a plurality of sodium sulfur cells each including an inner tube, the sodium-sulfur cells being cross-cut to form an opening, said apparatus comprising:

a work-setting pipe unit including a plurality of holding pipes into which the sodium sulfur cells are to be set, respectively, such that the opening of each of the sodium sulfur cells is downwardly directed, each of said holding pipes having, in a bottom portion, a through hole having a diameter slightly greater than the diameter of the outer periphery of the inner tube of each of the sodium sulfur cells;

a work-setting station in which the sodium sulfur cells are set into the work-setting pipe unit;

a heating oil vessel filled with a heating oil and adapted to receive flow of sodium from the sodium sulfur cells by heating;

a sodium-extracting station for holding said work-setting pipe unit inside said heating oil vessel;

an inner tube-extracting station arranged inside said heating oil vessel and provided with plural sets of chuck pawls, said plural sets of chuck pawls being adapted to be inserted into the inner tubes of the sodium sulfur cells through the openings of the sodium sulfur cells and said through holes of the holding pipes and to extract the inner tubes from the sodium sulfur cells through the openings and said through holes;

an unloading station where the sodium sulfur cells from which the sodium and the inner tubes are removed are extracted from the work-setting pipe unit; and a transferring unit for transferring said work-setting pipe unit among said stations.

2. The apparatus set forth in claim 1, wherein said chuck pawls are slidable in mutually perpendicular X- and Y-directions.

3. The apparatus set forth in claim 1, wherein the work-setting station is provided inside an oil vessel, and said transferring unit transfers the sodium sulfur cells from the oil vessel to the heating oil vessel in the state that the openings of the cells are sealed.

* * * * *